United States Patent
Yi

(10) Patent No.: US 7,120,242 B2
(45) Date of Patent: Oct. 10, 2006

(54) APPARATUS FOR INTERWORKING BETWEEN HETEROGENEOUS NO. 7 SIGNALING NETWORKS AND METHOD THEREOF

(75) Inventor: Seung-Hee Yi, Kyungki-Do (KR)

(73) Assignee: LG Electronics Inc., Seoul (KR)

( * ) Notice: Subject to any disclaimer, the term of this patent is extended or adjusted under 35 U.S.C. 154(b) by 978 days.

(21) Appl. No.: 09/879,201

(22) Filed: Jun. 13, 2001

(65) Prior Publication Data

US 2003/0061391 A1    Mar. 27, 2003

(30) Foreign Application Priority Data

Jun. 14, 2000    (KR) ............................... 2000-32743

(51) Int. Cl.
*H04M 7/00*    (2006.01)
(52) U.S. Cl. ............................... 379/220.01; 370/58.3; 709/223

(58) Field of Classification Search .................... None
See application file for complete search history.

(56) References Cited

U.S. PATENT DOCUMENTS

| | | | | |
|---|---|---|---|---|
| 5,268,895 A | * | 12/1993 | Topper | 370/385 |
| 5,953,404 A | * | 9/1999 | Fikis et al. | 379/230 |
| 2001/0033549 A1 | * | 10/2001 | Yi | 370/236 |
| 2001/0049730 A1 | * | 12/2001 | Brendes et al. | 709/223 |

* cited by examiner

Primary Examiner—Creighton Smith
(74) Attorney, Agent, or Firm—Fleshner & Kim, LLP

(57) ABSTRACT

A common channel signaling network, and more particularly, an apparatus and method for interworking between heterogeneous No. 7 signaling networks are provided. Additional functions required for interworking between heterogeneous No. 7 signaling networks can be minimized by managing a signaling network and handling a signaling message, respectively, during interworking between different No. 7 signaling networks. In addition, the reliability and performance of a signaling network can be maximized by using an already established function of managing each signaling network.

9 Claims, 6 Drawing Sheets

- - - → TRANSFER OF STATUS INFORMATION OF SIGNALING POINT

——→ SIGNALING MESSAGE TRANSFER

APPARATUS FOR INTERWORKING BETWEEN HETEROGENEOUS NO. 7 SIGNALING NETWORKS AND METHOD THEREOF

BACKGROUND OF THE INVENTION

1. Field of the Invention

The present invention relates to a common channel signaling network, and more particularly, to an apparatus for interworking between heterogeneous No. 7 signaling networks and method thereof.

2. Background of the Related Art

Generally, common channel signaling (CCS) is a signaling method in which traffic lines and signaling lines are operated. Signals for calls are transmitted via the signaling lines. A No. 7 signaling network is one common channel signaling method.

Since a No. 7 signaling network is configured according to the then current recommendation to the ITU-T, or by different providers, heterogeneous No. 7 signaling networks exist.

FIG. 1 is a drawing illustrating the relationship between heterogeneous No. 7 signaling networks. As illustrated in FIG. 1, signaling point C carries out interconnection between signaling network x and signaling network y, which are different from each other.

Signaling point C executes a signaling network management function of appropriately reconstructing a signaling network in order to ensure a reliable transmission of a signaling message, according to the requirements for signaling network performance even when a signaling link and a signal transfer point are in an abnormal state. Signaling point C further provides a signaling message handling function of reliably transferring a signaling message generated by a user part of an originating signaling point to a target user part of a destination signaling point.

Signaling point C integrally manages signaling networks, regardless of the types of signaling networks. Thus, a signaling network management that conforms to the characteristics of the corresponding signaling network is performed by judging a signaling network to which the destination signaling point of the corresponding signaling message belongs whenever the corresponding signaling message is discriminated. In addition, since signaling network x and signaling network y are separate signaling networks, signaling point C performs the screening function of a signaling network management message.

Referring to FIG. 2, signaling point C includes a message discrimination unit 1, a message distribution unit 2, and a message routing unit 3, so as to perform the signaling message handling function. The message discrimination unit 1 determines whether or not the destination signaling point of a signaling message is a signaling point to which the message discrimination unit 1 belongs. If the destination signaling point is a signaling point to which the message discrimination unit 1 belongs, the message distribution unit 2 distributes the signaling message to the corresponding local user part. If not, the message routing unit 3 routes the signaling message to an ultimate destination signaling point.

The related art interworking between heterogeneous No. 7 signaling networks has various problems. For example, signaling networks must be separated from each other in view of the management of signaling networks since the interworking between the networks means the interworking between signaling messages. However, because a signaling point for interworking between heterogeneous No. 7 signaling networks in the related art integrally carries out the signaling network management function regardless of the types of signaling networks, each signaling network must perform the additional function of screening a signaling network management message of other signaling networks.

In addition, since the signaling point for interworking between heterogeneous No.7 signaling networks in the related art carries out the signaling message handling function regardless of the types of signaling networks, the signaling network to which the destination signaling point of the corresponding signaling message belongs must be judged whenever the corresponding signaling message is discriminated, thus increasing the load of the signaling point.

Moreover, when another interworking between signaling networks is necessary, the existing software for executing the signaling network management function cannot be reused, but instead requires an overall modification. Consequently, a lot of time and cost is needed for functional stabilization.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

It is another object of the present invention to provide a method and apparatus for interworking between heterogeneous No. 7 signaling networks that is capable of efficiently routing a signaling message to other signaling networks by executing a signaling network management function and a signaling message handling function, respectively, according to the type of a signaling network during interworking between different No.7 signaling networks.

To achieve at least the above objects in whole or in parts, there is provided an apparatus for interworking between heterogeneous No.7 signaling networks according to the present invention, which includes a plurality of signaling network processing units corresponding to heterogeneous No.7 signaling networks to interwork with each other one to one and executing a signaling network management function and signaling message handling function for a corresponding signaling network respectively, and a cross-routing controlling unit disposed between the plurality of signaling network processing units for storing network management information of each signaling network transmitted from the plurality of signaling network processing units and cross-routing a signaling message between the plurality of signaling network processing units based on the stored network management information of each signaling network.

To further achieve at least the above objects in whole or in parts, there is provided a method of interworking between heterogeneous No.7 signaling networks according to the present invention, which includes managing the status information of signaling networks belonging to each signaling network by receiving status information of signaling points belonging to each signaling network from signaling network processing units separated according to the type of a signaling network, and requesting cross-routing of a received signaling message to heterogeneous signaling networks, if the destination signaling point of the signaling message is not contained in homogeneous networks; and cross-routing the signaling message to the signaling network belonging to the destination signaling point, if it is judged that crossrouting is possible based on the status of the destination signaling point of the signaling message to be requested to be cross-routed and the received status information of signaling points.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

The preferred embodiment of the present invention will now be described with reference to the accompanying drawings.

Figure 1:
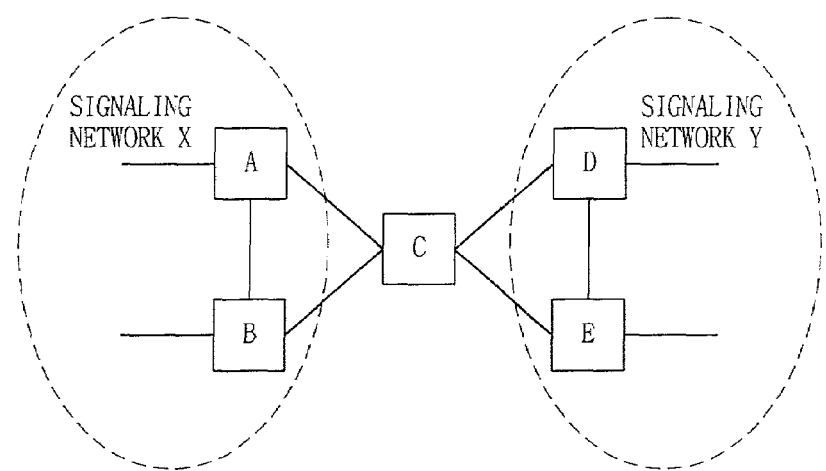
FIG. 1 is a block diagram illustrating one example of the interconnection relationship between heterogeneous No.7 signaling networks.
Figure 2:
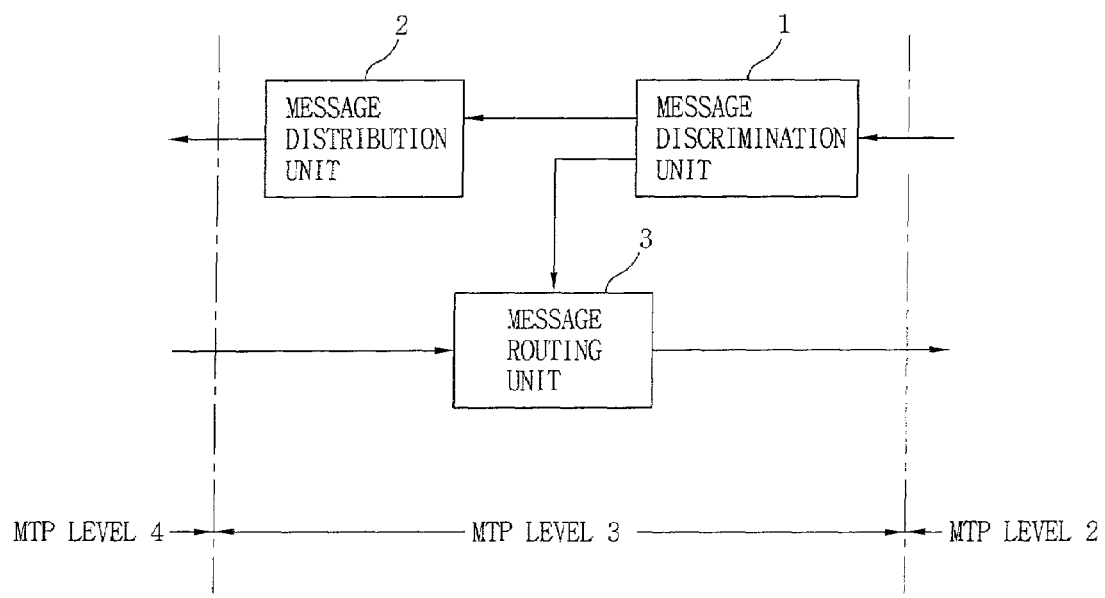
FIG. 2 is a block diagram illustrating blocks for handling a message of an apparatus for interworking between heterogeneous No.7 signaling networks according to the related art.

The apparatus for interworking between heterogeneous No. 7 signaling networks and method thereof according to the present invention is identical to that shown in FIG. 1. Accordingly, no additional description will be given.

Figure 3:
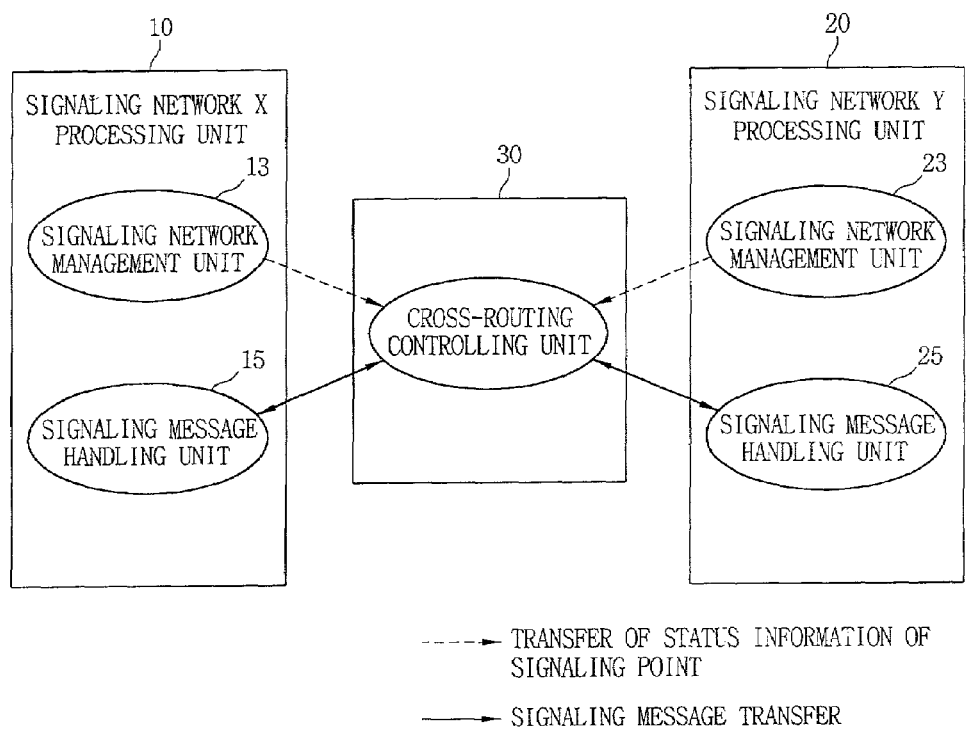
FIG. 3 is a block diagram illustrating interworking between heterogeneous No.7 signaling networks according to a preferred embodiment of the present invention.

FIG. 3 is a block diagram illustrating the interworking between heterogeneous No.7 signaling networks according to the preferred embodiment.

As illustrated in FIG. 3, the apparatus for interworking between heterogeneous No. 7 signaling networks preferably includes a signaling network x processing unit 10 for interfacing with signaling network x, a signaling network y processing unit 20 for interfacing with signaling network y, and a cross-routing controlling unit 30 coupled between the signaling network x processing unit 10 and the signaling network y processing unit 20. The cross-routing control unit 30 is configured to perform cross-routing of a signaling message between heterogeneous signaling networks x and y.

The signaling network x processing unit 10 and the signaling network y processing unit 20 each preferably include a signaling network management unit 13 and 23 for performing network management of a corresponding signaling network and transmitting the state of each signaling point corresponding to the signaling network to the cross-routing controlling unit 30. Each signaling network processing unit 10, 20 further includes a signaling message handling unit 15 and 25, to transmit the signaling message to be cross-routed to heterogeneous signaling networks from the signaling messages transmitted from the corresponding signaling network to the cross-routing controlling unit 30, and route the signaling message transmitted from the cross-routing controlling unit 30 to the corresponding signaling network.

The cross-routing controlling unit 30 preferably cross-routes a signaling message to the signaling network processing unit in the signaling network to which the destination signaling point of the signaling message belongs. This is done by referring to a signaling point status information transmitted from each signaling network processing unit 10 and 20.

Figure 4:
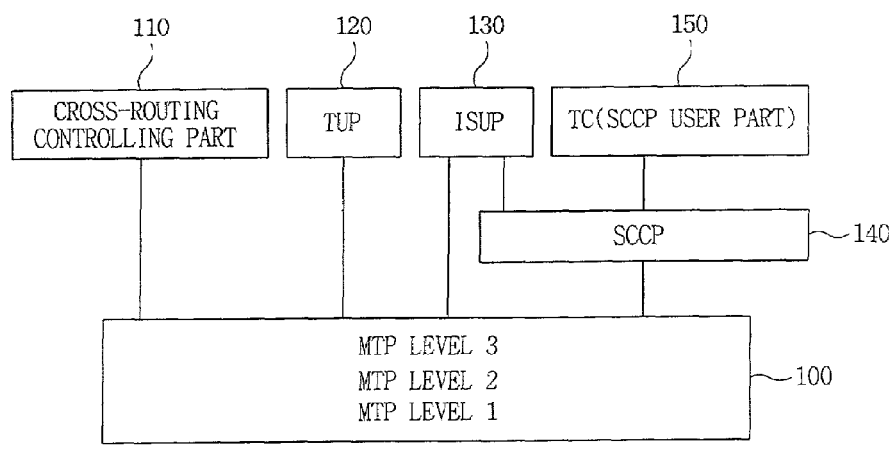
FIG. 4 is a drawing illustrating a protocol structure for a signaling point for carrying out interworking between heterogenous No.7 signaling networks according to the preferred embodiment of the present invention.

FIG. 4 illustrates a protocol structure for a signaling point for carrying out interworking between heterogeneous No.7 signaling networks according to the preferred embodiment. As shown therein, the protocol stack of the signaling point for carrying out interworking between heterogeneous No. 7 signaling networks preferably includes a message transfer part (MTP) 100, for performing the transfer of a signaling message and a cross-routing controlling part 110, for performing interworking of a signaling message between heterogeneous No. 7 signaling networks. The protocol stack further includes a telephone user part (TUP) 120, for performing functions such as telephone signal processing, call switched connection control, etc., and an ISDN user part (ISUP) 130, for handling a wide variety of services of an Integrated Services Digital Network (ISDN). Finally, the protocol stack includes a signaling connection control part (SCCP) 140, for enabling the transmission of various signals or data besides common line-associated control signals, and a transaction capabilities (TC) part 150, for performing control of a conversion facility and special centers (e.g., a database, special facility unit, and maintenance & repair center).

The TUP 120, ISUP 130, and SCCP 140 are MTP user parts, and the TC 5 is a SCCP user part. Particularly, the cross-routing controlling part 110 added according to the present invention is recognized as a MTP user part by the MTP 100.

In comparison of the MTP 100 with the OSI (Open System Interconnection) model of the ISO (International Organization for Standardization), MTP level 1 executes the functions of layer 1 of the OSI, MTP level 2 executes the functions of layer 2 of the OSI, and MTP level 3 executes the functions of layer 3 of the OSI.

In addition, the signaling network x processing unit 10 and the signaling network y processing unit 20, as shown in FIG. 3, execute the MTP protocol function of FIG. 4, and the cross-routing controlling unit 30 is recognized as a MTP user part for a MTP protocol element.

Therefore, the signaling network processing unit performing the MTP protocol function of the present invention interfaces with a corresponding signaling network in a one-to-one manner, and the cross-routing controlling unit performing the MTP user part function cross-routes a signaling message between the signaling network processing units.

Figure 5:
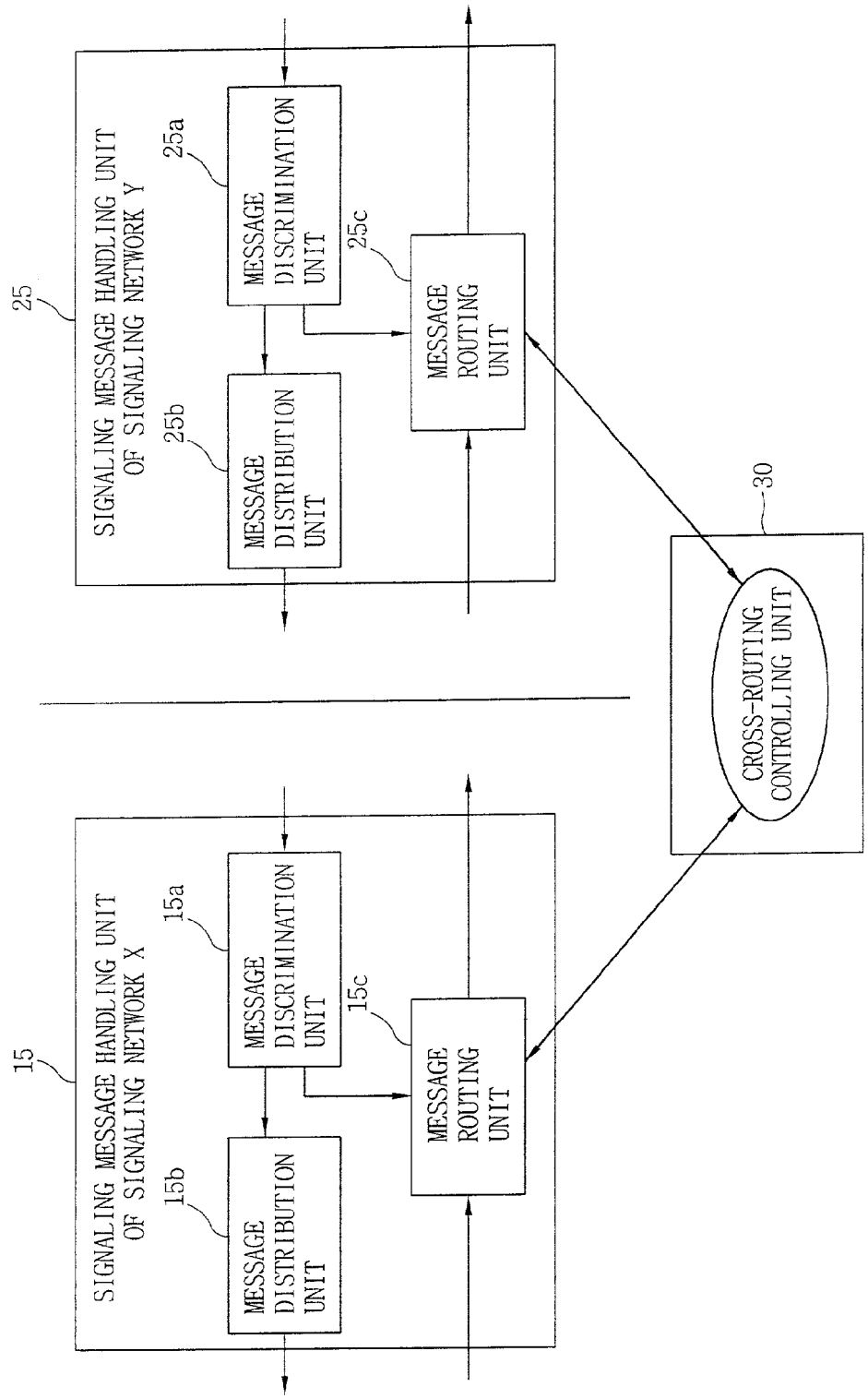
FIG. 5 is a block diagram illustrating a signaling message handling unit of each signaling network processing unit in the apparatus (signaling point) for carrying out interworking between heterogeneous No.7 signaling networks according to the preferred embodiment of the present invention.

FIG. 5 is a diagram illustrating the signaling message handling unit 15, 25 of each signaling network processing unit in the apparatus (signaling point) for carrying out interworking between heterogeneous No. 7 signaling networks according to the preferred embodiment.

As illustrated in FIG. 5, the signaling message handling unit 15, 25 of each signaling network processing unit 10, 20 preferably includes a message discrimination unit 15a, 25a for determining whether or not the destination signaling point of the signaling message transmitted from a corresponding signaling network is a current signaling point. Each unit 10, 20 further includes a message distribution unit 15b, 25b, for distributing the signaling message to a local MTP user part, if the destination signaling point of the signaling message is the current signaling point, and a message routing part 15c, 25c, for requesting that the signaling message be cross-routed to a heterogeneous signaling network, if the destination signaling point of the signaling message is not the current signaling point and does not exist in the corresponding signaling network.

In operation, each signaling network management unit 13, 23 of each signaling network processing unit 10, 20 transmits status information for each signaling point contained in a corresponding signaling network that interfaces with the signaling network management unit 13, 23 to the cross-routing controlling unit 30. The cross-routing controlling unit 30 stores the status information of each signaling point received from the corresponding signaling network management unit 13, 23 and manages the status of each signaling point of heterogeneous signaling networks.

If a signaling message is to be transmitted from a signaling network, the corresponding signaling message handling unit 15, 25 transmits the signaling message to the cross-routing controlling unit 30 so that the destination signaling point of the received signaling message is cross-routed to heterogeneous signaling networks if the received signaling message's destination does not exist in the signaling point, i.e., it does not exist in homogeneous signaling networks. The cross-routing controlling unit 30 cross-routes the signaling message to the destination signaling network processing unit in accordance with the status information of each signaling point. The destination signaling message handling unit receives the signaling message from the cross-routing controlling unit, and routes the received signaling message to the corresponding destination signaling point.

The operation of the apparatus for interworking between heterogeneous No.7 signaling networks according to the preferred embodiment will now be described in more detail with reference to the accompanying drawings.

Figure 6:
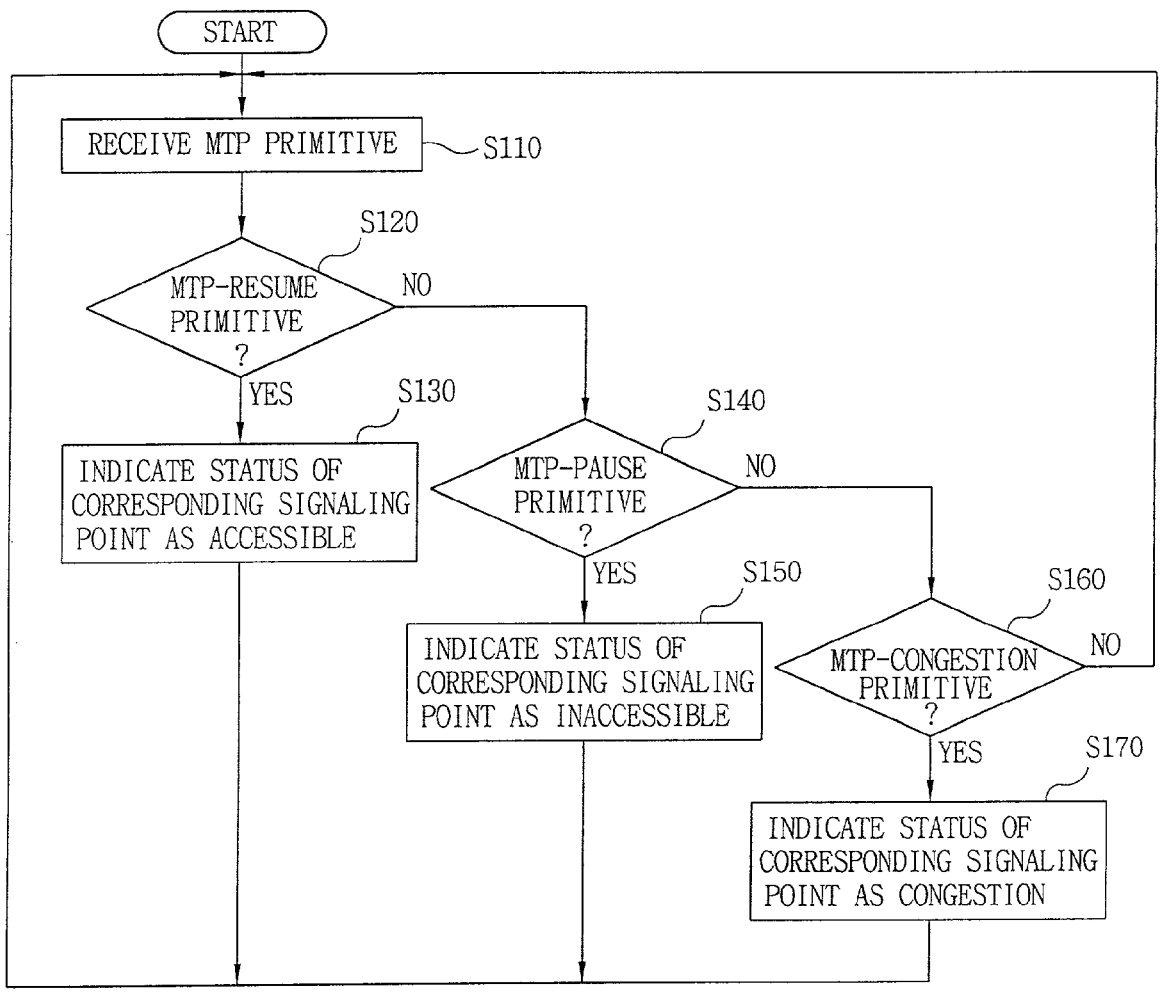
FIG. 6 is a flow chart illustrating a signaling network management method in the apparatus for interworking between heterogeneous No. 7 signaling networks according to the preferred embodiment of the present invention.

Referring to FIG. 6, the signaling network management unit 13 of the signaling network x processing unit 10 transmits a MTP primitive to the cross-routing controlling unit 30. The MTP primitive represents the status information of the signaling point contained in signaling point x. In addition, the signaling network management unit 23 of the signaling network y processing unit 20 also transmits a MTP primitive representing the status information of the signaling point contained in signaling point y to the cross-routing controlling unit 30. These MTP primitives are received by the crossrouting control part in step S110.

The cross-routing controlling unit 30 then checks the type of the received MTP primitive to determine if the primitive is a MTP-RESUME primitive in step S120. If the received MTP primitive is a MTP-RESUME primitive, then a signaling message can be transferred to the corresponding signaling point. Accordingly, the cross-routing controlling unit 30 indicates the status of the signaling point of the corresponding signaling network as "accessible" in a database managing the status of a signaling point of each signaling network in step S130.

If the primitive is not a MTP-RESUME primitive, then it is determined if it is a MTP-PAUSE primitive in step S140. If the primitive is a MTP-PAUSE primitive, indicating that a signaling message cannot be transferred to the corresponding signaling point, the cross-routing controlling unit 30 indicates the status of the signaling point as "inaccessible" in the database in step S150.

If the primitive is not a MTP-PAUSE primitive, then it is determined if it is a MTP-CONGESTION primitive in step S160. If the received MTP primitive is a MTP-CONGESTION primitive, indicating that a corresponding signaling point is congested, the cross-routing controlling unit 30 indicates the status of the signaling point as "congestion" in step S170.

The cross-routing controlling unit 30 thus manages the status of each signaling point of heterogeneous signaling networks.

Figure 7:
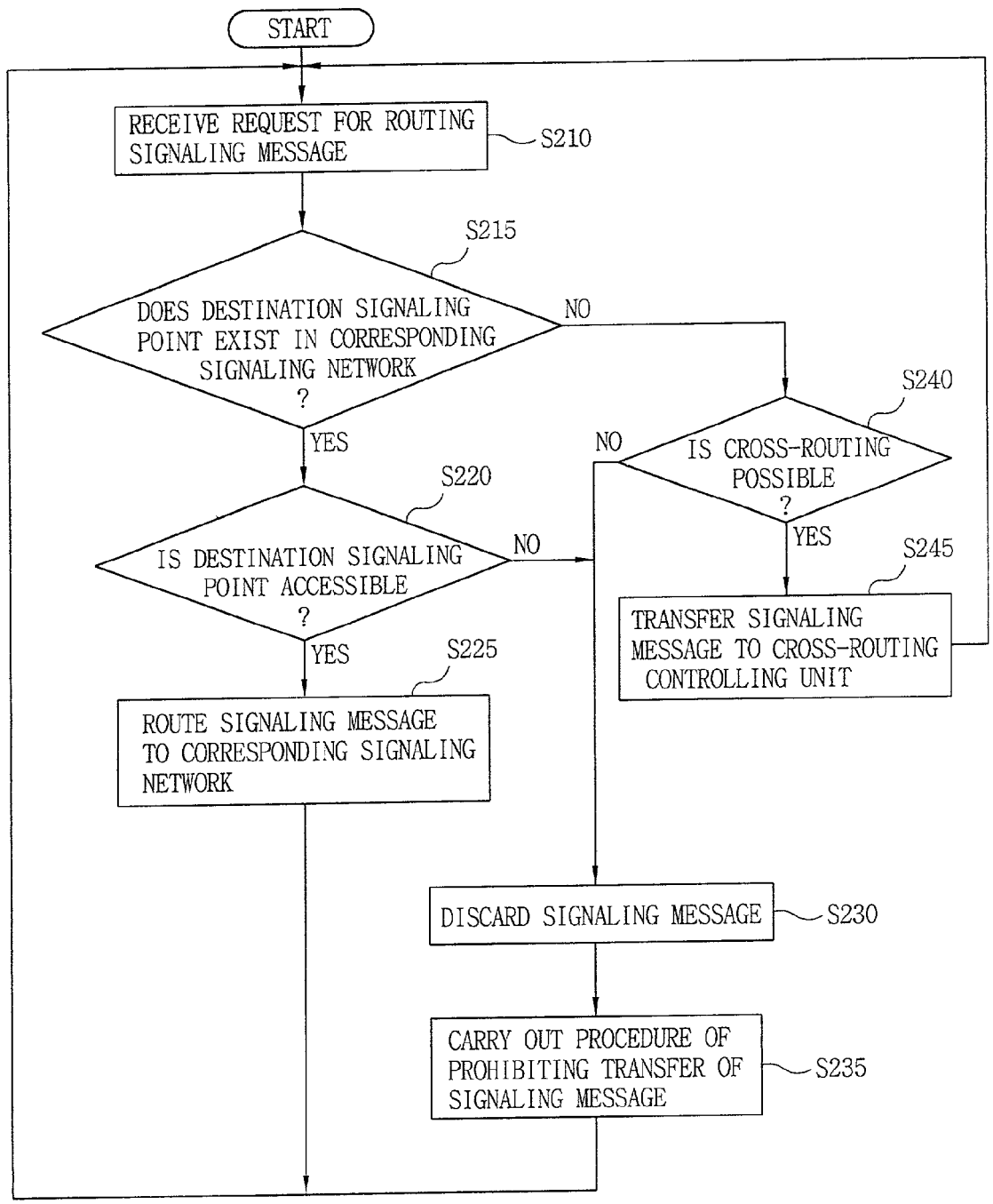
FIG. 7 is a flow chart illustrating a method of requesting cross-routing of a signaling message in the apparatus for interworking between heterogeneous No.7 signaling networks according to the preferred embodiment of the present invention.

Referring next to FIG. 7, a method of requesting cross-routing of a signaling message is described. The signaling message handling unit 15 of the signaling network x processing unit 10 initially receives a signaling message from signaling network x. If the message discrimination unit 15a of the signaling message handling unit 15 transmits a request for routing the signaling message, the request is received by the message routing unit 15c in step S210. Next, the message routing unit 15c determines whether the destination signaling point exists in signaling network x, in step S215.

If the destination signaling point exists in signaling network x, it is next determined whether the destination signaling point is accessible or inaccessible in step S220. If accessible, the signaling message is routed to the destination signaling point of signaling network x, in step S225. If, however, the destination signaling point is inaccessible, the message routing unit 15c discards the signaling message in step S230, and prohibits the transfer of a signaling message to the destination signaling point in step S235.

If in step S215 it is determined that the destination signaling point does not exist in signaling network x, the message routing unit 15c determines whether the cross-routing of the signaling message is possible or impossible in step S240.

To make this determination, the message routing unit 15c stores information regarding signaling points of each signaling network capable of cross-routing a signaling message between heterogeneous signaling networks. If the destination signaling point of a signaling message corresponds to one of the stored signaling points, it is determined that the cross-routing of the corresponding signaling message is possible. If, however, the destination signaling point does not correspond to one of the stored signaling points, it is determined that the cross-routing of the corresponding signaling message is impossible.

Therefore, in step S240, the message routing unit 15c determines whether the destination signaling point of the signaling message corresponds to one of the signaling points capable of cross-routing. If the destination signaling point corresponds to one of the signaling points capable of crossrouting, the message routing unit 15c determines that the cross-routing of the signaling message is possible, and transmits the signaling message to the cross-routing controlling unit 30 using a MTP-TRANSFER indication primitive in step S245.

If, however, the destination signaling point does not correspond to one of the signaling points capable of cross-routing, the message routing unit 15c determines that the cross-routing of the signaling message is impossible, and discards the signaling message in step S230. Then, the procedure of prohibiting the transfer of the signaling message to the destination signaling point is performed in step S235.

Meanwhile, if the signaling message is cross-routed from the cross-routing controlling unit 30 via the MTP-TRANSFER request primitive and received by the message routing unit in step S210, the message routing unit 15c determines whether the destination signaling point of the cross-routed signaling message is contained in a corresponding homogeneous signaling network, as shown in step S215. If so contained, it is then determined whether the destination signaling point is accessible in step S220. If the destination signaling point is determined to be accessible, the message routing unit 15c routes the signaling message to the corresponding destination signaling point in step S225.

It should be noted that the operation of the signaling message handling unit 25 of the signaling network y processing unit 20 is carried out in the same manner as the operation of the signaling message handling unit 15 of the signaling network x processing unit 10.

Figure 8:
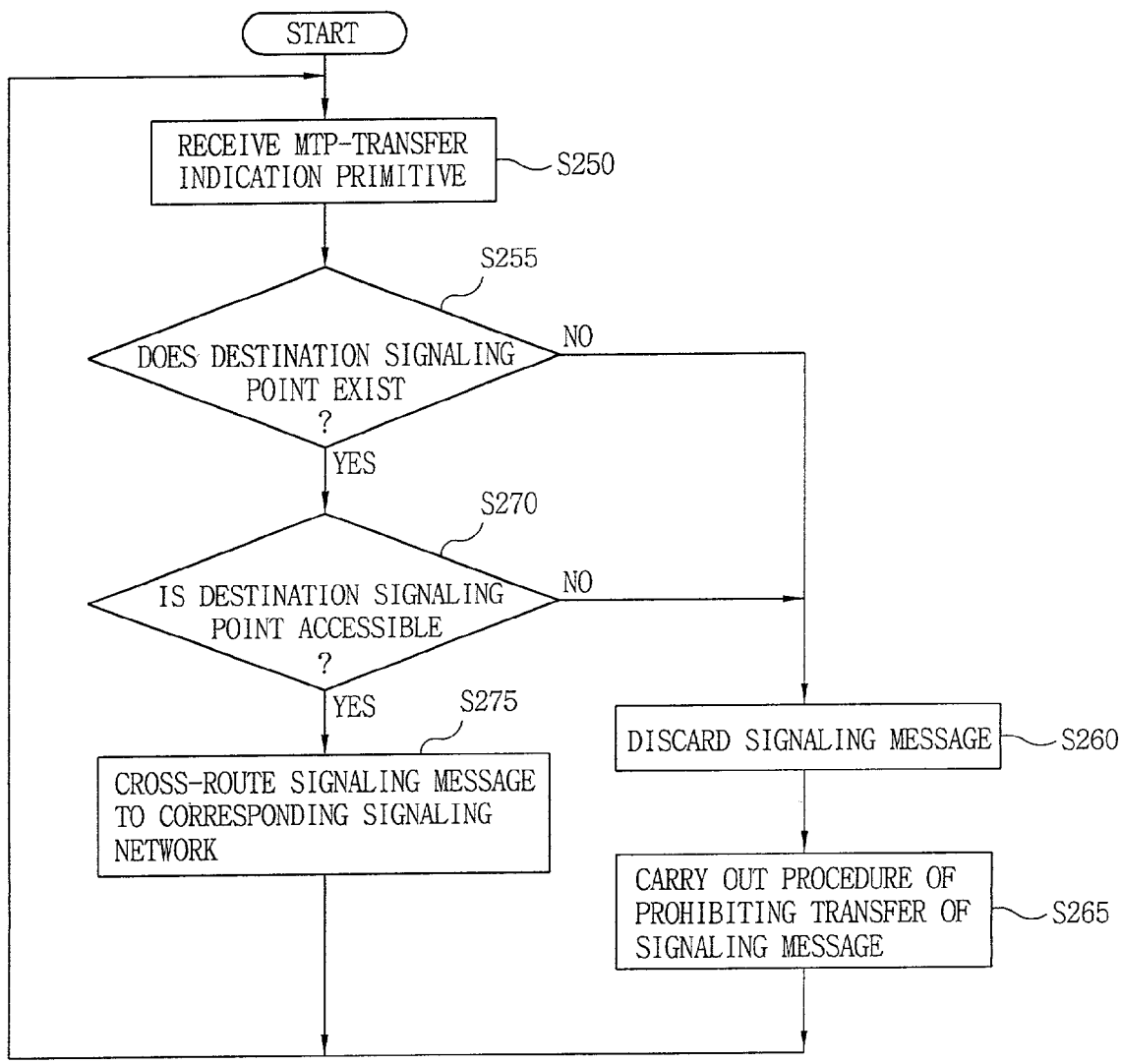
FIG. 8 is a flow chart illustrating a method of cross-routing a signaling message in the apparatus for interworking between heterogeneous No. 7 signaling networks according to the preferred embodiment of the present invention.

Referring next to FIG. 8, a method of cross-routing a signaling message is described. When the cross-routing controlling unit 30 receives a MTP-TRANSFER indication primitive from the signaling message routing unit 15c of the signaling message handling unit 15 in step S250, the cross-routing controlling unit 30 determines whether the destination signaling point of the signaling message to be cross-routed exists, as shown in step S255. The cross-routing controlling unit 30 preferably stores information relating to signaling points capable of cross-routing for each signaling network, and manages the same. Thus, it is determined whether the destination signaling point of the signaling message to be cross-routed corresponds to ones of the signaling points capable of cross-routing.

As a result of the determination in step S255, if it is possible to cross-route the signaling message to the destination signaling point, it is then determined whether the destination signaling point of the signaling message to be cross-routed is accessible in step S270. This determination is made based on the status information of signaling points belonging to each signaling network received from the signaling network management unit 13, 23 of each signaling network processing unit 10, 20.

As a result of the determination in step S270, if the destination signaling point of the signaling message is accessible, the cross-routing controlling unit 30 cross-routes the signaling message to the corresponding signaling network. For example, if the destination signaling point of the signaling message is a signaling point D of signaling network y, the cross-routing controlling unit 30 cross-routes the signaling message to the message routing unit 25c of the signaling message handling unit 25 in the signaling network y processing unit 20. The message routing unit 25c then routes the received signaling message to signaling network y by performing the message routing method as shown in FIG. 7.

As described above, the apparatus and method for interworking between heterogeneous No. 7 signaling networks according to the preferred embodiment of the present invention has many advantages. For example, the development of additional functions required for interworking between heterogeneous No.7 signaling networks can be minimized by operating the function of managing a signaling network and the function of handling a signaling message, respectively, during interworking between different No. 7 signaling networks. In addition, the reliability and performance of a signaling network can be maximized by using an already established function of managing each signaling network.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An apparatus for interworking between heterogeneous No. 7 signaling networks, comprising:

a plurality of signaling network processing units corresponding to heterogeneous No. 7 signaling networks, each configured to interwork with each other in a one-to-one manner, and each configured to execute a signaling network management function and a signaling message handling function for a corresponding signaling network; and a cross-routing controlling unit coupled between the plurality of signaling network processing units and configured to store network management information of each signaling network transmitted from each of the plurality of signaling network processing units and configured to cross-route a signaling message between the plurality of signaling network processing units based on the stored network management information, wherein each of the plurality of signaling network processing units each comprises:

a signaling network management unit to perform network management for a corresponding signaling network and transmit a state of each signaling point corresponding to the signaling network to the cross-routing controlling unit; and a signaling message handling unit to transmit the signaling message to be cross-routed from a corresponding current signaling network to the cross-routing controlling unit, and route the signaling message transmitted from the cross-routing controlling unit to a corresponding destination signaling network, and wherein the signaling message handling unit comprises:

a message discrimination unit to determine whether the destination signaling point of the signaling message is a current signaling point;

a message distribution unit to distribute the signaling message to a corresponding local message transfer part (MTP) user part in the current signaling point, if the destination signaling point of the signaling message is the current signaling point; and a message routing unit to request that the signaling message be cross-routed to a heterogeneous signaling network, if the destination signaling point of the signaling message is not the current signaling point and does not exist in the corresponding current signaling network.

2. The apparatus of claim 1, wherein the message routing unit routes the signaling message to the corresponding signaling network if it receives the signaling message routed by the cross-routing unit, and if the destination signaling point of the received signaling message is contained in the corresponding signaling network and is accessible, and otherwise the message routing unit routes the signaling message to the corresponding destination signaling point.

3. The apparatus of claim 1, wherein the signaling network processing unit performs functions of a message transfer part (MTP) protocol, and the cross-routing controlling unit performs functions of a MTP user part protocol for the signaling network processing unit, among No. 7 protocols.

4. The apparatus of claim 1, wherein the cross-routing controlling unit routes the signaling message to the signaling network processing unit of a destination signaling network in accordance with the status information of the signaling point transmitted from each signaling network processing unit.

5. A system for interworking heterogeneous No. 7 signaling networks, comprising:
   first and second signal network processing units, each coupled to a corresponding heterogeneous No. 7 signaling network; and
   a cross-routing control unit coupled to each of the signal networking processing units, wherein the cross-routing control unit stores network management information received from the first and second signal network processing units and performs cross-routing of a signaling message from the first signal network processing unit to the second signal network processing unit, wherein each of the first and second signal network processing units comprises:
   a signaling network management unit to perform network management for a corresponding signaling network and transmit a state of each signaling point corresponding to the signaling network to the cross-routing controlling unit; and
   a signaling message handling unit to transmit the signaling message to be cross-routed from a corresponding current signaling network to the cross-routing controlling unit, and route the signaling message transmitted from the cross-routing controlling unit to a corresponding destination signaling network, and wherein the signaling message handling unit comprises:
   a message discrimination unit to determine whether the destination signaling point of the signaling message is a current signaling point;
   a message distribution unit to distribute the signaling message to a corresponding local message transfer part (MTP) user part in the current signaling point, if the destination signaling point of the signaling message is the current signaling point; and
   a message routing unit to request that the signaling message be cross-routed to a heterogeneous signaling network, if the destination signaling point of the signaling message is not the current signaling point and does not exist in the corresponding current signaling network.

6. The system of claim 5, wherein the cross-routing control unit receives a MTP-transfer primitive from the first signal network processing unit, which indicates that a signaling message needs to be transferred from the first signaling network to the second signaling network, determines whether a signaling point of the second signaling point is accessible, and cross-routes the signaling message from the first signaling network to the second signaling network if the destination signaling point is accessible.

7. The system of claim 5, wherein the cross-routing control unit receives a first MTP primitive, which represents status information of a first signaling point of the first signal network, receives a second MTP primitive, which represents status information of a second signaling point of the second signaling network, determines a type the MTP primitive received from each of the first and second signaling points, and determines a status of each of the first and second singling points based on the type of MTP primitive received from the corresponding signaling point to manage the status of each of the signaling points.

8. The system of claim 5, wherein each of a first and second signaling point associated with the first and second network processing units, respectively, request cross-routing of a signaling message by determining if a destination signaling point exists in the requesting signaling network, determining whether cross-routing of the signaling message to the destination signaling network is possible, and transmitting the signaling message to the cross-routing control unit using a MTP-transfer indication primitive.

9. The system of claim 5, wherein the message routing unit routes the signaling message to the corresponding signaling network if it receives the signaling message routed by the cross-routing unit, and if the destination signaling point of the received signaling message is contained in the corresponding signaling network and is accessible, and otherwise the message routing unit routes the signaling message to the corresponding destination signaling point.

* * * * *